United States Patent [19]

Klingler et al.

[11] Patent Number: 5,544,826
[45] Date of Patent: Aug. 13, 1996

[54] CUTTER KNIFE FOR ENSILAGE HARVESTER CUTTERHEAD

[75] Inventors: Alban Klingler, Gersheim; Georg Leeb, Zweibrucken, both of Germany

[73] Assignee: Deere & Company, Moline, Ill.

[21] Appl. No.: 451,696

[22] Filed: May 26, 1995

[30] Foreign Application Priority Data

May 28, 1994 [DE] Germany .......................... 44 18 697.5

[51] Int. Cl.⁶ .............................. B02C 18/06; B02C 18/18
[52] U.S. Cl. .......................................... 241/242; 241/294
[58] Field of Search ................................... 241/242, 294, 241/300.1

[56] References Cited

U.S. PATENT DOCUMENTS

| | | | |
|---|---|---|---|
| 413,024 | 10/1889 | Carter et al. | 241/294 |
| 829,229 | 8/1906 | Piesslinger | 241/294 |
| 3,805,660 | 4/1974 | Burrough | 83/658 |
| 4,011,998 | 3/1977 | Holdeman | 241/55 |
| 4,061,284 | 12/1977 | Raisbeck et al. | 241/294 |
| 4,257,566 | 3/1981 | Lawrence | 241/221 |

FOREIGN PATENT DOCUMENTS

| | | |
|---|---|---|
| 1116464 | 11/1961 | Germany . |
| 2737683 | 9/1989 | Germany . |

OTHER PUBLICATIONS

Taarup Fine Chop Forage Harvester 406 Brochure entitled "A High Capacity Fine Chop Forage Harvester for Wilted Crops and Maize Harvesting", 4 pages, published in Denmark (No Date Given).

Primary Examiner—John Husar

[57] ABSTRACT

A cutter head includes a plurality of short cutter knives respectively mounted to flat rectangular trailing surfaces of angular blade retainers welded to the exterior of a cylindrical cutterhead drum. The knives each include a flat rectangular attaching flange, bolted to the trailing surface of a respective retainer, and a cutting or separating region configured in two different embodiments as a single trapezoid which is respectively coplanar with, or bent or twisted relative to, the attaching region. In third and fourth embodiments, the separating region is configured as a double trapezoid, with the third embodiment having the short sides of the trapezoids joined along a line of symmetry from which the separating region is bent in increasing amounts towards respective long sides of the trapezoids, and with the fourth embodiment having the long sides of the trapezoids joined along the line of symmetry in which case the separating region is bent from the attaching region an amount which increases toward the line of symmetry from the respective short sides of the trapezoids. Used together with the planar knives is a wedge-shaped shim which is sandwiched between the attaching region of the knife and a planar attaching surface.

13 Claims, 3 Drawing Sheets

⌣ ⌣ ⌣ ⌣ Fig. 13

CUTTER KNIFE FOR ENSILAGE HARVESTER CUTTERHEAD

BACKGROUND OF THE INVENTION

The invention concerns a cutter knife with an attaching flange and a separating or cutting region, that blends into a cutting edge, the cutter knife being mounted to knife retainers attached to the outer contour of a cylindrical cutterhead drum so as to be parallel to the axis of rotation of the drum and to be in several circular rows.

German Pat. No. 2,737,683 granted 23 Mar. 1978 (corresponds to U.S. Pat. No. 4,061,284 granted to Raisbeck et al on 6 Dec. 1977) and U.S. Pat. No. 4,257,566 granted to Lawrence on 24 Mar. 1981 each reveal an ensilage harvester cutterhead arrangement including a cylindrical drum on which is supported a plurality of knives where each of the knives extends only over a portion of the width of the drum. Each knife is retained in a friction lock in an angular knife retainer welded to the outer surface of the drum. Each knife of the German patent extends evenly mn a single plane while each knife of the U.S. '566 patent has a leading end bent slightly towards the drum from its planar mounting portion so as to define an angle in the order of 165° to 178° with the mounting portion.

U.S. Pat. No. 4,011,998 granted to Holdeman et al on 15 Mar. 1977 reveals a further cutterhead arrangement whose flat knives are retained in several circumferential rows on disk-shaped carriers, thus defining an open design. The knives are attached to the carriers in such a way that their cutting edges may optionally be oriented either parallel or inclined to the axis of rotation of the rotor. The orientation of the cutting edges of the knives with respect to the axis of rotation is a result of the shape or the arrangement of the knife retainers on the carriers.

According to German Pat. No. 1,116,464 granted 2 Nov. 1961, several circumferential rows of planar knives extend between and are mounted to axially spaced disk-shaped carriers and to spiders extending radially between the carriers. The cutting edges of the knives are inclined with respect to the axis of rotation of the cutterhead and sweep an imaginary cylinder as the cutterhead rotates.

The Danish company Taarup has marketed a Model 406 forage harvester having a cutterhead including a closed drum on whose outer circumferential surface knife retainers are welded in such a way that the cutting edges of the knives mounted to the carriers are inclined to the axis of rotation of the cutterhead so as to sweep an imaginary cylinder as the cutterhead rotates.

A somewhat typical representation of a cutterhead design having helically twisted blades that extend over the full width of the cutterhead is disclosed in U.S. Pat. No. 3,805, 660 granted on 23 Apr. 1974.

The aforementioned prior art cutterheads suffer from one or more of the disadvantages of having (a) knives arranged with their cutting edges parallel to the axis of rotation of the cutterhead resulting in high power consumption, (b) knives which are helically twisted and thus difficult to manufacture, (c) knives which extend over the entire width of the cutterhead and hence are expensive to replace and/or (d) knives which are difficult to mount.

SUMMARY OF THE INVENTION

According to the present invention there is provided an improved knife for being mounted to a cutterhead drum.

A broad object of the invention is to provide a cutterhead knife design which overcomes all of the above-mentioned disadvantages of the knives of the prior art.

A more specific object of the invention is to provide a first cutterhead knife embodiment which is flat and has a trapezoidal cutting region joined to a rectangular mounting region, the knife being adapted for being mounting to a flat surface of an angular retainer using a wedge-shaped shim which acts to dispose the knife edge for sweeping an imaginary cylinder during rotation of the cutterhead.

Yet another specific object is to provide a second cutterhead knife embodiment which includes a trapezoidal cutting region joined to a flat rectangular mounting region, the knife being adapted for being mounted with its mounting region directly against a flat surface of an angular retainer and the separating region being bent or twisted relative to the mounting region so as to dispose the knife edge for sweeping an imaginary cylinder during rotation of the cutterhead.

Still another object of the invention is to provide third and fourth cutterhead knife embodiments wherein each knife includes a rectangular mounting region to which is joined right and left hand trapezoidal separating regions that are joined at a line of symmetry of the knife at either respective short sides or respective long sides such as to form a knife edge respectively having an inverted "V" or a "V" shape, the two trapezoidal separating regions being bent or twisted relative to the mounting region such that the knife edge is disposed for sweeping an imaginary cylinder during rotation of the cutterhead.

These and other objects of the invention will be apparent from a reading of the following description together with the appended drawings.

BRIEF DESCRIPTION OF THE DRAWINGS

FIGS. 7 through 13 are schematic representations of various dispositions of cutting edges on the cutterhead drum that are possible with the various embodiments with the mounting regions being disposed the same for all embodiments.

DESCRIPTION OF THE PREFERRED EMBODIMENT

Figure 1:
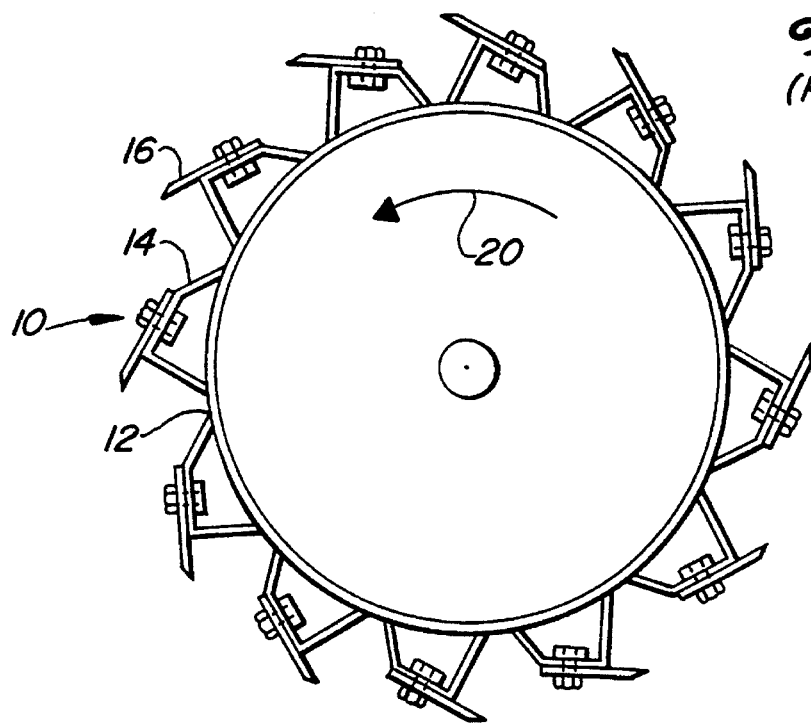
FIG. 1 is a side view of a cutterhead drum with cutter knives mounted to retainers carried by the drum in accordance with the prior art.
Figure 2:
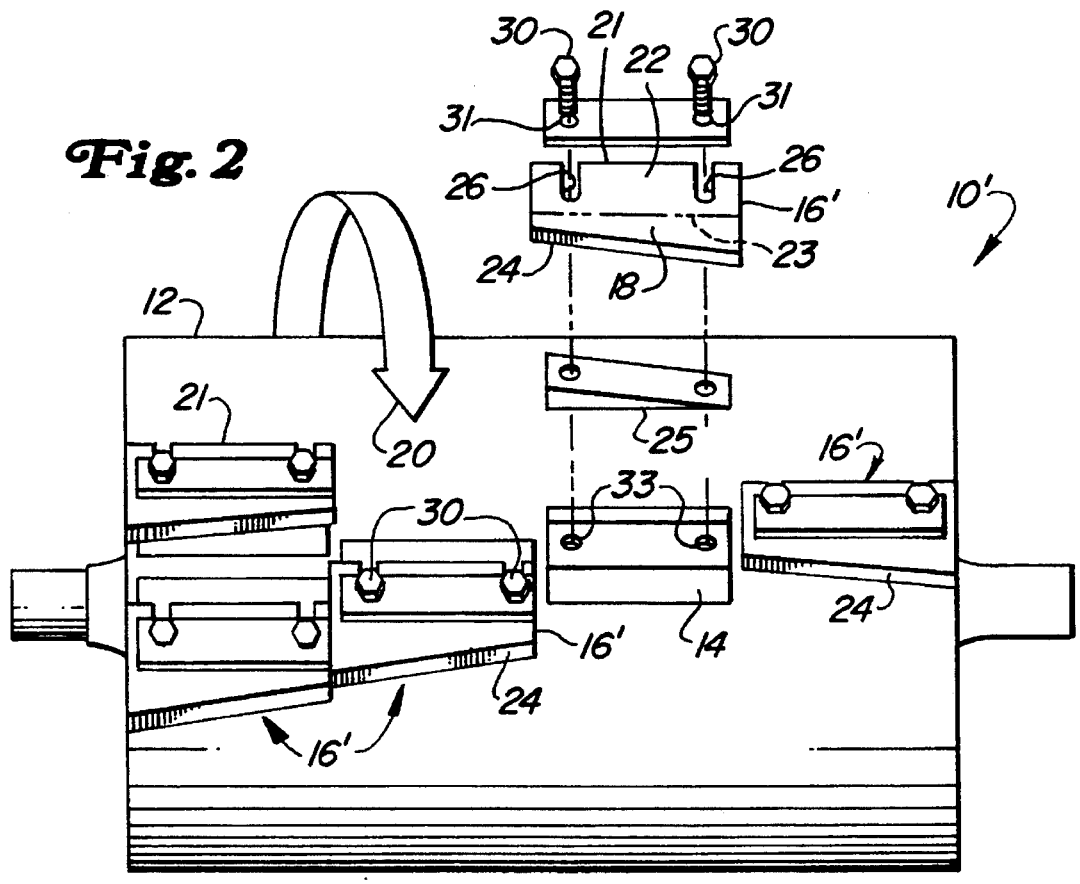
FIG. 2 is a front view of a cutterhead drum with only a representative number of retainers and knives being shown, the knives being flat in accordance with a first knife embodiment and with one of the knives and wedge shaped shims being shown in exploded fashion from one of the retainers.

Referring now to FIG. 1, there is shown a cutterhead 10 representing the prior art, and including a closed cylindrical drum 12 whose longitudinal centerline coincides with its axis of rotation. Angular knife retainers or mounting brackets 14 are welded to the outer periphery of the drum 12. The knife retainers 14 are arranged in such a way that they extend parallel to the axis of rotation of the cutterhead 10, where, as seen in FIG. 2, the knife retainers 14 are arranged in several circular rows with the knives of adjacent rows being offset with respect to each other in the circumferential direction. Flat knives 16, such as those disclosed in the aforementioned U.S. Pat. No. 4,061,284, include respective rectangular mounting regions secured to the retainers and respective leading rectangular separating or cutting regions projecting beyond the retainers and having leading cutting edges which are parallel to the axis of rotation of the cutterhead.

Referring now to FIG. 2, there is shown a cutterhead 10' which, except for cutter knives 16'(note that the same reference numeral is used for right and left hand knives) is identical in all respects to the prior art cutterhead 10 with common structure being given the same reference numerals. Specifically, each cutter knife 16' is structured in accordance with a first knife embodiment of the present invention so as to include a unitary flat member comprising a leading trapezoidal separating or cutting region 18, as considered relative to a direction of rotation indicated by the arrow 20, and a rectangular attaching or mounting region 22, an imaginary line 23 being shown on the knife 16' that is shown in an exploded fashion in FIG. 2. The right knives 16' (those mounted to the right half of the drum 12) and the left knives 16' (those mounted to the left half of the drum 12) are mirror images of each other with the longer sides of the right knives being at their right ends and with the longer sides of the left knives being at their left ends. Each attaching region 22 is attached to a flat rectangular trailing surface of a given one of the angular mounting brackets or retainers 14 in such a way that a trailing edge 21 of the attaching region is angled relative to the axis of the drum, thereby disposing a leading cutting edge 24 of the cutting region 18 at an angle to the axis of the drum. The divergence or the angle between the cutting edge 24 and the imaginary line 23, which is oriented parallel to the trailing edge 21 of the attaching region 22, and, hence, to the axis of rotation of the drum 12, is approximately 7°, but may be varied over a range of approximately ±5°. Sandwiched between the mounting region 22 of each knife 16' and a trailing surface of one of the retainers 14 for disposing the cutting edge 24 of each knife 16' so that it sweeps an imaginary cylinder during rotation of the drum 12 and, thus, is disposed for low power consumption during cutting off lengths from crop being fed across an opposing cutting edge of a stationary knife or cutterbar, not shown, is an appropriately ramped or angled shim 25. For the purpose of permitting such mounting, longitudinal slots 26 extend from the trailing edge 21 of each knife mounting region 22 in a direction toward the separating region 18 and accommodate bolts 30 extending through holes 31 in a rectangular pressure plate 34 located atop the shim 25 and a further set of holes 33 provided in the retainer or bracket 14. The bolts 30 are screwed into respective threaded holes provided in a retaining bar 32 (visible only in FIG. 3) located in the free space beneath the retainer wall to which the knife 16' is clamped. Thus, the bolts 30, shim 25 and pressure plate 34 cooperate to form coupling means for securing each knife 16 to one of the retainers 14 it will be appreciated that the use of slots 26 in the attaching region 22 of the knives 16' permits movement of the knives for maintenance purposes or upon impact with a foreign object.

Figure 3:
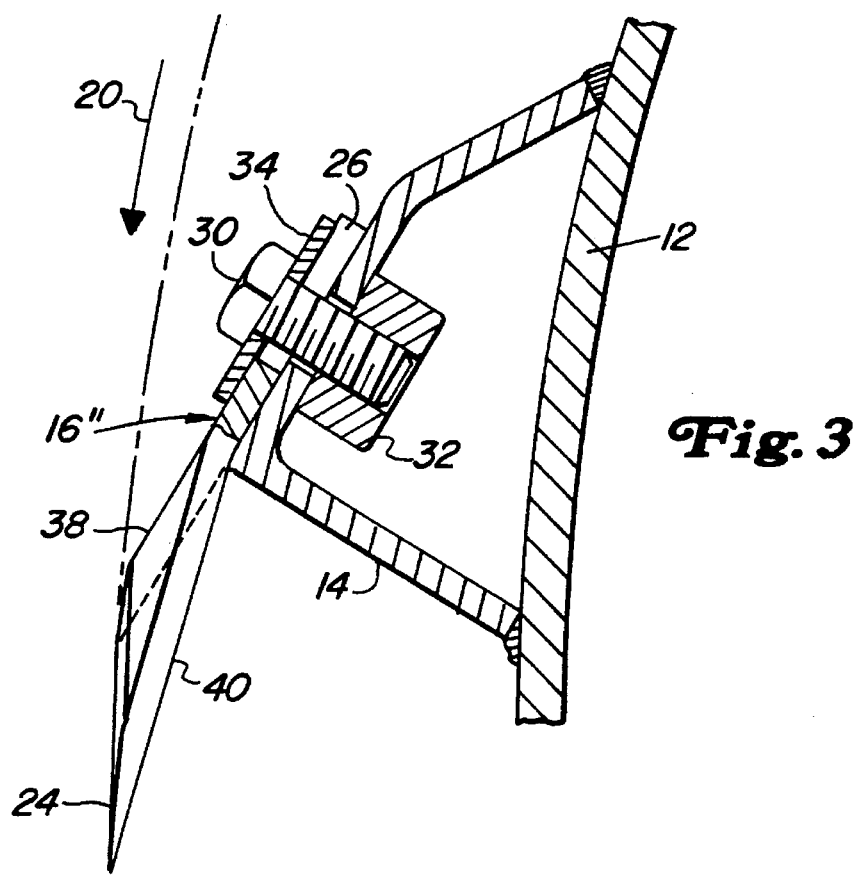
FIG. 3 is an enlarged sectional view of a second knife embodiment having its separating section bent or twisted relative to its planar mounting section so as to eliminate the need for the shim.
Figure 4:
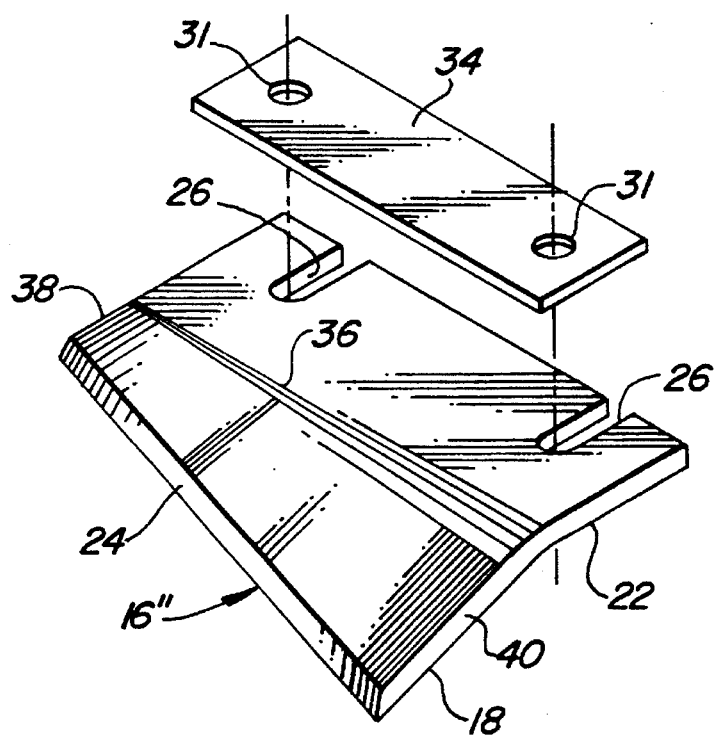
FIG. 4 is a perspective view of the knife and clamping force distributing plate shown in FIG. 3.

FIGS. 3 and 4 illustrate a second knife embodiment according to the invention. Specifically, therein is shown a knife 16" having a trapezoidal leading cutting or separating region 18' and a rectangular mounting region 22, the separating region 18' being bent or twisted downwardly along a bend line 36 at the forward end of the region 22. As viewed in FIG. 4, the separating region 18' has a left end 38 which is shorter than its right end 40 and the amount of downward bend along the line 36 increases from left to right. Thus, as viewed in FIG. 3, the end of the cutting edge 24 remote from the viewer is at a higher elevation than is the closer end and thus leads in cutting as the drum 12 is rotated in accordance with the direction of the arrow 20. This results in the knives 16" having a trailing cut, like the above-described knives 16', so as to consume only a low amount of power during cutting. Further, it will be appreciated then that, by bending or twisting the separating region 18' of the knife 16" relative to the mounting region 22, the need for using the wedge-shaped shim 25 is eliminated.

Figure 5:
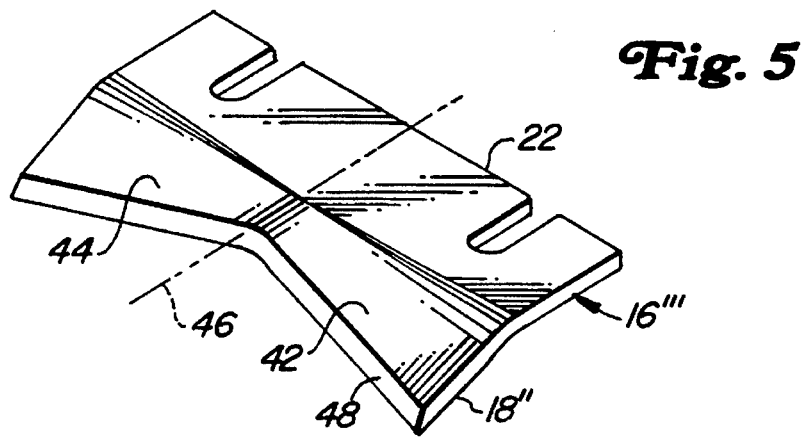
FIG. 5 is a view of a third knife embodiment having a separating region joined to its rectangular mounting region, the separating region including right and left hand trapezoidal portions having respective short sides joined at a line of symmetry of the knife so as to form an inverted "V" shaped cutting edge.

Referring now to FIG. 5, therein is shown a further cutter knife embodiment. Specifically, a knife 16''', like all of the previously described knife embodiments, includes a rectangular mounting region 22. However, joined to this mounting region is a leading separating or cutting region 18" comprising right and left trapezoidal portions 42 and 44, respectively, having their respective short ends joined along an imaginary line of symmetry 46 of the knife, with the downward bend of each trapezoidal portion relative to the mounting region 22 increasing from the line of symmetry 46 to the longer end of the trapezoidal portion 42 or 44. This results in a leading cutting edge 48 of the separating region 18" being in the form of an inverted "V" which operates during cutting to deflect stalks being cut toward the center of the cutting edge 48.

Figure 6:
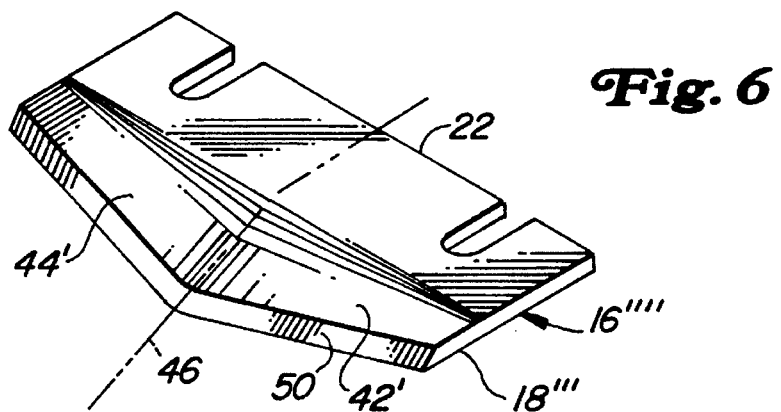
FIG. 6 is a view of a fourth knife embodiment similar to that disclosed in FIG. 5, but having respective long sides of its trapezoidal portions joined to each other along a line of symmetry so as to form a "V" shaped cutting edge.

Referring now to FIG. 6, therein is shown yet a further cutter knife embodiment. Specifically, a cutter knife 16'''' is shown which is similar to the cutter knife 16''' in that it has a rectangular mounting region 22 to which is joined a separating region 18''' comprising right and left trapezoidal portions 42' and 44' joined along the line of symmetry 46. However, in this embodiment, respective longer sides of the right and left trapezoidal portions 42' and 44' are joined along the line of symmetry 46 with the amount of downward bend of each trapezoidal portion being at a maximum at the line of symmetry 46 and decreasing from there to respective shorter ends of the trapezoidal portions 42' and 44'. This results in a leading edge 50 of the separating region 18''' being in the form of a "V".

In all of the cutter knife embodiments the respective cutting edges of the knives, when the latter are mounted to drum-carried retainers, are disposed on an imaginary cutting cylinder which makes it possible to grind the cutter knives with a conventional grinding attachment.

The cutter knives 16' or 16" can be arranged on the knife retainers 14 as shown schematically in FIGS. 7 through 11 while the cutter knives 16'''and 16'''' can respectively be arranged in accordance with FIGS. 12 and 13. Accordingly, in the case of four circular rows located next to each other in particular:

a) as to FIG. 7, the cutter knives 16 or 16" on the left half of the drum are arranged with their long sides to the left so that the cutting edges 24 are inclined in one direction relative to the cutter drum axis and on the right half of the drum are arranged with their long ends to the right so that the cutting edges 24 are inclined in an opposite direction relative to the cutter drum axis right blades inclined in the opposite direction, b) as to FIG. 8, the positions of the cutter knives 16' and 16" are reversed relative to the positions shown in FIG. 7, c) as to FIG. 9, the positions of the cutter knives 16' or 16" are such that every other row is inclined in the same direction beginning at left end of the drum with the short end of the knives 16' or 16" being at the left end of the knife, d) as to FIG. 10, the positions of the cutter knives 16' or 16" are just switched from those in FIG. 9 so that knives with long left ends are positioned at the left end of the drum, e) as to FIG. 11, just knives 16' or 16" having long left ends are shown arranged so that their cutting edges fall along a straight line, and f) as to FIGS. 12 and 13, the cutting edges 24 of the respectively of the knives 16'''and 16'''' are arranged to respectively form of an inverted "V" and a "V" in every circular row.

We claim:

1. In an ensilage harvester cutterhead knife including a planar, rectangular attaching region joined to a separating region that blends into a cutting edge, the improvement comprising: said separating region including at least one trapezoidal portion having first and second ends of unequal length joined by said cutting edge; and said separating region being increasingly angled relative to said attaching region from said first end to said second end with said first end being coplanar with said attaching region.

2. The cutterhead knife defined in claim 1 wherein said trapezoidal portion extends the full length of said cutterhead knife.

3. The cutterhead knife defined in claim 1 wherein said separating region includes two trapezoidal portions having respective short sides joined at a line of symmetry extending parallel to long sides at opposite ends of said knife; and said separating region being angled relative to said attaching region in an increasing amount from said line of symmetry to each of said long sides of said trapezoidal portions, whereby said cutting edge is in the form of an inverted "V".

4. The cutterhead knife defined in claim 1 wherein said separating region includes two trapezoidal portions having respective long sides joined at a line of symmetry extending parallel to short sides at opposite ends of said knife; and said separating region being angled relative to said attaching region in an increasing amount from each of said short sides to said line of symmetry, whereby said cutting edge is in the form of a "V".

5. The cutterhead knife defined in claim 1 wherein said knife is formed from a flat plate and said cutting edge, before said separating region is angled relative to said attaching region, being oriented with at an angle of from 2° to 12° with respect to an edge on said attaching region opposite from said separating region.

6. In a cutterhead including a closed cylindrical drum having a plurality of angular knife retainers fixed to an outer surface of the drum in a plurality of circular rows along the width of the drum, each retainer including a flat rectangular mounting surface extending lengthwise of said drum in parallel relationship to an axis of rotation of said drum, a cutter knife being mounted to each retainer and including a planar rectangular attaching region, coupling means for securing said attaching region to said rectangular mounting surface, and each cutter knife further including a separating region extending beyond said mounting surface and blending into a cutting edge, the improvement comprising: the separating region of each knife including at least one trapezoidal portion having short and long ends joined by said cutting edge and being disposed such that, as considered across the width of the drum, one end of the cutting edge leads the other end with the entire cutting edge being located along an imaginary cylinder extending about said axis of rotation of said drum.

7. The cutterhead defined in claim 6 wherein said attaching region of each cutter knife including a trailing edge extending parallel to an axis of rotation of said drum; said separating region being angled with respect to said planar rectangular attaching region of the associated knife such that, as considered across the width of the drum, one end of the cutting edge leads the other end with the entire cutting edge being located along an imaginary cylinder extending about said axis of rotation of said drum.

8. The cutterhead defined in claim 6 wherein said separating region includes only one trapezoidal portion and this portion extends the full width of said knife and is co-planar with said attaching region; and said coupling means including a wedge-shaped shim sandwiched between said attaching region of said knife and said planar mounting surface of said retainer and being oriented so as to separate said short end of said trapezoidal portion a greater distance from said mounting surface than is said long end, with said cutting edge being located along said imaginary cylinder extending about the axis of rotation of the drum.

9. The cutterhead defined in claim 6 wherein each knife attaching region includes a trailing edge as considered relative to a forward direction of rotation of said drum and a pair of mounting slots extending perpendicular to and opening at said trailing edge; and said coupling means including an attaching bolt received in each mounting slot.

10. The cutterhead defined in claim 6 wherein said cutting edge is disposed at an angle of 2° to 12° with respect to a line extending perpendicular to said short and long ends of said trapezoidal portion.

11. The cutterhead defined in claim 8 wherein said knife is planar with said separating region being defined by only one trapezoidal portion; and said coupling means including a wedge-shaped shim inserted between the attaching region of the knife and the mounting surface of said retainer so as to dispose the cutting edge of said knife along an imaginary cylinder extending about the axis of rotation of the drum.

12. The cutterhead defined in claim 6 wherein said knife has a trailing edge as considered with respect to a forward direction of rotation of said drum; said separating region being defined by a pair of trapezoidal portions having respective short ends joined at a line of symmetry extending perpendicular to said trailing edge, and respective long ends at opposite sides of said knife; and said separating region being angled relative to said planar attaching region in increasing amounts in opposite directions from said line of symmetry to said respective long ends of the trapezoidal portions, whereby said cutting edge is an inverted "V" shape.

13. The cutterhead defined in claim 6 wherein said knife has a trailing edge as considered with respect to a forward direction of rotation of said drum; said separating region being defined by a pair of trapezoidal portions having respective long ends joined at a line of symmetry extending perpendicular to said trailing edge, and respective short ends at opposite sides of said knife; and said separating region being angled relative to said planar attaching region in increasing amounts from said short ends to said line of symmetry, whereby said cutting edge is "V" shaped.

* * * * *